United States Patent [19]
Frankenberg et al.

[11] 3,986,103
[45] Oct. 12, 1976

[54] MONITORING CIRCUIT FOR A PLURALITY OF VALVES

[75] Inventors: Wolfgang Frankenberg; Claus Lentz, both of Erlangen, Germany

[73] Assignee: Siemens Aktiengesellschaft, Munich, Germany

[22] Filed: Dec. 5, 1974

[21] Appl. No.: 529,924

[30] Foreign Application Priority Data
Dec. 5, 1973 Germany............................ 2360659

[52] U.S. Cl..................................... 323/24; 321/11; 321/27 R
[51] Int. Cl.².......................................... G05F 5/00
[58] Field of Search............ 317/33 SC, 52; 321/11, 321/13, 14, 27 R; 323/24

[56] References Cited
UNITED STATES PATENTS

| | | |
|---|---|---|
| 3,110,856 | 11/1963 | Albert........................ 317/33 SC X |
| 3,205,423 | 9/1965 | Kanngiesser.................. 321/27 R X |
| 3,408,558 | 10/1968 | Peterson et al................ 317/33 SC |

*Primary Examiner*—William M. Shoop
*Attorney, Agent, or Firm*—Kenyon & Kenyon Reilly Carr & Chapin

[57] ABSTRACT

The invention concerns a monitoring circuit for a number of simultaneously current-carrying valves. In order to obtain an alarm signal in the event of trouble in a valve, provision is made that the primary winding of a current transformer is arranged in series with each of the valves; that the secondary windings of the current transformers are connected in a ring via intermediate taps; and that each intermediate tap is connected to a center tap of a bridge circuit constructed from auxiliary valves, whose output current can be taken off as the alarm signal.

16 Claims, 3 Drawing Figures

MONITORING CIRCUIT FOR A PLURALITY OF VALVES

BACKGROUND OF THE INVENTION

1. Field of the Invention

The invention concerns a monitoring circuit for a plurality of simultaneously current-carrying valves.

2. Description of the Prior Art

In converters for high power, e.g., in a-c control elements, it is often necessary to connect several valves, in particular thyristors (SCR's), in parallel in one valve branch, if one valve alone is not capable of carrying or switching the desired current. All the valves of the valve branch should uniformly carry the same current.

In such a converter, there may occur a situation where at least one valve of the valve branch carries too large a current. This current can exceed the current-carrying capacity of the valve, so that it is in danger of being thermally destroyed. To prevent such failures, one can connect in series with each of the individual valves a fuse which responds in the event of an overload.

In such a converter, however, there may also occur an asymmetrical current distribution and where one valve carries too large a current, in comparison with the other valves, but is still within the permissible current-carrying capacity. Such a situation cannot be indicated nor prevented by fuses, although it of course would be desirable.

Finally, it may happen in such a converter that a valve takes no current or too little current in comparison with adjacent valves. The reason for this may be that the valve does not function because of a defect, in the case of a semiconductor valve, for instance, because of a contact failure (interruption) between its anode-cathode path. However, the reason may also be that a fuse in series with the valve in question has blown and the current path is interrupted. In a controlled valve, the reason may, finally, also be that the triggering of this valve was intermittent, for instance, due to a failure of the control unit or a fault in the control loop. In the last-mentioned situation the remaining parallel-connected valves of the valve branch must take over the current of the dropped-out valve. They are thereby stressed to the limit of their current carrying capacity or even beyond. Current interruption could heretofore be indicated only by a blown fuse. Also in such a situation, it is advisable to obtain a trouble alarm if a current interruption of the valve in question has occurred for any reason whatever, so that an alarm and/or protective measures can be released.

Accordingly, it is an object of the invention to provide a monitoring circuit for a number of simultaneously current carrying valves, which in the event of trouble of any kind in a valve, indicates this trouble or faulty loads in the other valves and delivers an alarm signal. It should make no difference whether the simultaneously current-carrying valves are controlled or uncontrolled electric valves such as, for instance, thyristors or diodes.

SUMMARY OF THE INVENTION

According to the invention, this object is met by providing that in series with each of the valves the primary winding of a current transformer is arranged; that the secondary windings of the current transformers are connected in a ring via intermediate taps; and that every intermediate tap is connected to a center tap of a bridge circuit constructed from auxiliary valves, whose output current can be taken off as the alarm signal.

The secondary windings of the current transformers are connected together in such a manner that in normal operation a uniform current distribution over the individual current transformers results. Practically no resulting rectified difference current flows as the output current, while with non-uniform current distribution, which may stem from any type of trouble, a current flows via the bridge circuit, which functions as a rectifier. The alarm signal delivered by the bridge circuit indicates whether or not a defect has occurred in one of the monitored valves.

It should also be noted that the monitoring circuit according to the invention can be used not only if the valves to be monitored are connected parallel to each other and belong to one and the same converter. It can be used also if the valves to be monitored are parts of different converters. The only requirement is that the valves carry current simultaneously. This is the case, for instance, with converters which are parallel-connected on the input side and feed the same loads.

The indicating signal can be utilized as an alarm signal and/or as a release signal to release a protective device for the valves of the converter or converters. In the case of parallel-connected valves, for example, it is possible on the basis of the indicating signal to either reduce the current flowing via the valve branch in question or the load current, which can be accomplished, for instance, by reducing the set valve of the desired current, or it is possible prohibit current from flowing through the rectifier completely by deleting the firing pulses or through other measures. A similar procedure is possible if the monitored valves are associated with different converters.

The advantage of the disclosed monitoring circuit is its simple design, as it can be constructed from commercially available current transformers.

A further embodiment of the invention provides that the output of the bridge circuit is connected to a measuring resistor, whose voltage drop is taken off as the indicating signal.

DESCRIPTION OF THE INVENTION

Figure 1:
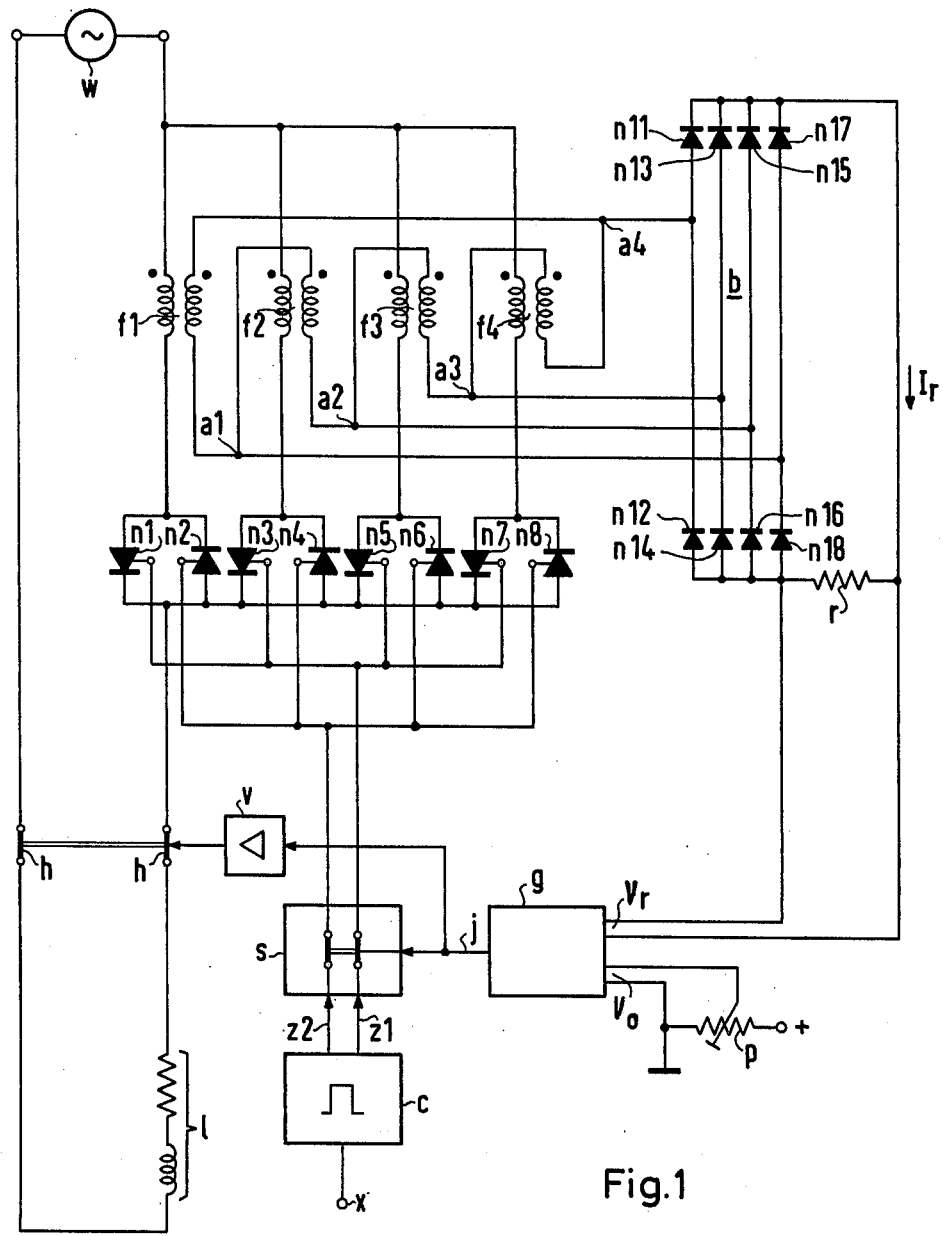
FIG. 1 shows an a-c control element with a monitoring circuit.

According to FIG. 1, an a-c voltage source $w$ is applied to a load $l$, which consists of an inductive and a resistive load component, via a converter. As the converter there is provided an a-c control element, which comprises a first valve branch for the positive current direction and a second valve branch for the negative current direction. Because of the magnitude of the load current to be controlled, the first valve branch for the positive current direction consists of four controlled valves $n1$, $n3$, $n5$ and $n7$, and the second valve branch for the negative current direction consists likewise of four controlled valves $n2$, $n4$, $n6$ and $n8$. Electric valves of any kind, but particularly semiconductor valves such as, transistors or thyristors, may be provided as the controlled valves $n1$ to $n8$. While in the embodiment example a total of $p = 4$ valves per valve branch is provided, the number $p$ can in general assume any value greater than 1.

One of the valve $n1$, $n3$, $n5$, $n7$ from the first valve branch for the positive current direction is connected directly antiparallel to one of the valves $n2$, $n4$, $n6$, $n8$, respectively, from the second valve branch for the negative current direction. For instance, the two controlled valves $n1$ and $n2$ are connected directly antiparallel. Furthermore, the cathodes of all valves $n1$, $n3$, $n5$, $n7$ of the first valve branch are connected with the anodes of all the valves $n2$, $n4$, $n6$, $n8$ of the second valve branch. With each of these directly antiparallel-connected circuit is associated a current transformer $f1$, $f2$, $f3$ and $f4$, respectively, e.g., the controlled valve $n1$ for the positive current direction and the controlled valve $n2$ for the negative current direction are jointly associated with the current transformer $f1$. The association is carried out so that the primary winding of the current transformers $f1$, $f2$, $f3$, $f4$ are connected in series with one valve $n1$, $n3$, $n5$, $n7$ of the first valve branch as well as simultaneously with one valve $n2$, $n4$, $n6$, $n8$ of the second valve branch. The free ends of the windings of this series connection are jointly connected to the one terminal of the a-c voltage source. The other terminal is connected with the load $l$. All the current transformers $f1$, $f2$, $f3$, and $f4$ have the same transformation ratio.

To feed pulses $z1$, $z2$ to the controlled valves $n1$ to $n8$, a control unit $c$ is provided, which in operation is addressed by a control signal $x$. When a firing pulse Z1 is delivered, the controlled valves $n1$, $n3$, $n5$ and $n7$ become conducting in the positive current direction. They carry the load current jointly. The division of the load current is here largely uniform. The parallel-connected valves $n1$, $n3$, $n5$, $n7$ of the first valve branch are connected for this current division. If a firing pulse $z2$ is delivered, the controlled valves $n2$, $n4$, $n6$, $n8$ for the negative current direction become conducting. They now carry jointly the load current in the reverse direction. Here, too, the division of the current is uniform, so that these valves $n2$, $n4$, $n6$ and $n8$ are designed accordingly.

In the event of failure of one of the valves $n1$ to $n8$, i.e., current interruption in this valve, the remaining valves of the valve branch in question must carry the current of the former. The remaining valves can thereby be stressed excessively and may also fail. In order to indicate such a disturbance of one or several valves of the two valve branches and thereby, incorrect loading of the remaining valves, a monitoring circuit is provided. The components of this monitoring circuit are the already mentioned current transformers $f1$, $f2$, $f3$, and $f4$.

In this monitoring circuit, the secondary windings of the current transformers, $f1$, $f2$, $f3$, and $f4$ are connected in a ring via intermediate taps $a1$, $a2$, $a3$, and $a4$. To make the ring connection visible in the figure, the ends of the same polarity of the secondary windings are marked by a dot, as are the corresponding primary windings. Each of the four intermediate taps $a1$, $a2$, $a3$, $a4$ is connected to a center tap of the bridge circuit $b$ composed of auxiliary valves $n11$ to $n18$. For a given number $p$ of parallel valves $n1$, $n3$, $n5$, $n7$ or $n2$, $n4$, $n6$, $n8$ per valve branch, a p-phase bridge circuit $b$ of uncontrolled auxiliary valves, e.g., semiconductor diodes, is necessary. Threshold diodes may also be provided as the auxiliary valves of the bridge circuit $b$. In the present case $p = 4$, and for series circuits of uncontrolled auxiliary valves are therefore connected in parallel. A measuring resistor $r$ is connected to the output of the bridge circuit. The bridge voltage Vr dropping across the measuring resistor $r$ is a measure for the output current $I_r$ of the bridge circuit $b$. This bridge voltage $V_r$ represents the indicating signal. The bridge voltage $V_r$ constitutes a trouble indication. If it is larger than zero, the symmetrical current flow through at least one of the valve branches is disturbed. It can be processed further as an alarm signal or as a signal for releasing a protective measure for the rectifier.

According to FIG. 1, a limit indicator $g$ is provided for this purpose. To this limit indicator is applied a reference voltage $V_o$, in addition to the bridge voltage $V_r$. The reference voltage $V_o$ is adjustable and represents a limit value which is predetermined by a limit setter $p$. In FIG. 1, a potentiometer is shown as the limit setter $p$. In the limit indicator $g$, the bridge voltage $V_r$ is compared with the reference voltage $V_o$. If the bridge voltage $V_o$ is larger than the reference voltage $V_o$, the limit indicator transmits an output signal on line $j$. The limit indicator $g$ is not necessary if threshold diodes are used as the auxiliary valves in the bridge circuit $b$.

This output signal on line $j$ can be used as an alarm signal directly. In the present case it is used as a signal for releasing a protective measure for the rectifier. According to a first possibility, it can be used for actuating a main switch $h$, e.g., a contactor, by way of an amplifier $v$. This main switch $h$ is arranged in the main circuit of the load $l$. If its control input is acted upon by the amplified output signal on line $j$, it disconnects the load $l$, so that current can no longer flow through the disturbed valve branch.

According to a second possibility, the output signal on line $j$ of the limit indicator $g$ can also be fed to an interrupter circuit $s$. This interrupter circuit $s$ is disposed between the output of the control unit $c$ and the control electrodes of the controlled valves $n1$ to $n8$. It consists essentially of two switches, of which one is arranged in the connecting line for the trigger pulses $z1$ to the control electrodes of the valve $n1$, $n3$, $n5$, $n7$ and the other, in the connecting line for the trigger pulses $z2$ to the control electrodes of the valves $n2$, $n4$, $n6$, $n8$. The output signal on line $j$ actuates the switch position of these two switches. Deviating from the illustration in FIG. 1, electronic switches are preferably used as switches instead of mechanical contacts. The interrupter circuit $s$ assures that the pulses are deleted in the event of trouble in one of the two valve branches. In that case it interrupts the transmission of the trigger pulses $z1$ and $z2$ for the valves $n1$ to $n8$ of both valve branches.

The secondary currents induced in the secondary windings of the current transformers $f1$, $f2$, $f3$, $f4$ essentially circulate in the ring circuit. The sum of the secondary currents rectified via the bridge circuit $b$, i.e., the output current $I_r$ which flows through the measuring resistor $r$, has only a minimum value. It is practically zero.

If one valve, for instance, the valve $n1$, is interrupted, the associated current transformer $f1$ carries no current on the primary side in the positive current direction. If the current direction is positive, no current flows in the secondary winding of this current transformer $f1$ either. In the positive current direction, the three remaining valves $n3$, $n5$ and $n7$ take over the current of the disturbed valve $n1$. To the same extent, to which the current through these valves $n3$, $n5$ and $n7$ has increased, so has the current in the secondary windings of the current transformers $f2$, $f3$ and $f4$. Thereby, the equilibrium previously existing in the positive current direction is cancelled, and the output current $I_r$ is no longer practically zero. The equilibrium existing in the negative current direction is preserved. A definite average value of the output current $I_r$ adjusts itself, which results in a definite average value of the bridge voltage $V_4$. If this average value is above the value of the preset reference voltage $V_o$, then the limit indicator $g$ delivers an output signal $j$, which according to FIG. 1 is used for interrupting the load current by means of the main switch $h$, as well as for deleting the trigger pulses $z1$, $z2$.

If also the current through the associated antiparallel-connected valve, e.g., the valve $n2$, is interrupted, the current transformer $f1$ no longer makes any contribution to the current in the ring circuit. Thus, also the equilibrium existing in the negative current direction is cancelled. Two half-waves, shifted by 180°, appear in the measuring circuit as the output current $I_r$ after rectification. The average value of the output current $I_r$ is in this case about twice that of the case discussed before, where one valve was interrupted. In this case, too, a signal for releasing a protective measure for the converter is transmitted, if the bridge voltage $V_r$ is larger than the set reference voltage $V_o$.

If on the other hand, a valve, e.g., the valve $n1$, is short-circuited, this short circuit also has an effect on the antiparallel connected valve, e.g., $n2$. In the measuring circuit appear likewise two rectified half-waves, as an unbalance occurs in the positive and the negative current direction. The means value of the output current $I_r$ further changes somewhat as to magnitude with the drive level of the other valves $n2$ to $n8$.

If however, a valve, e.g., the valve $n1$, has lost its ability to withstand voltage, it acts like a diode. In such a case, the equilibrium is disturbed in the one current direction, but not in the other. In the measuring circuit, a half-wave of the output current $I_r$ appears, which can likewise be used for releasing a protective measure.

In all the cases of trouble described, an indicating signal in the form of the bridge voltage $V_r$, the magnitude of which is distinctly different from its magnitude in normal operation therefore appears at the output of the monitoring circuit. This indicating signal is used for an alarm or trouble indication and/or for a disconnect action.

The application of the monitoring circuit is not limited to the parallel connection of four valves for each valve branch, as shown in FIG. 1. It can rather be expanded as desired in case of a larger number of parallel connections of such valves by the additional arrangement of current transformers and by adding further series circuits in the bridge circuit $b$. Therefore, if besides the four antiparallel pairs of valves shown, a fifth pair of valves is provided, for instance, then the monitoring circuit can be expanded by a fifth current transformer and a fifth pair of measuring valves. The monitoring circuit is also not limited to the application in an a-c control element. It can rather be used an any converter (rectifier) which comprises at least one valve branch with a number of parallel connected valves. In this connection, these valves need not be controlled valves; they may also be diodes which are operated with current of varying magnitude.

Figure 2:
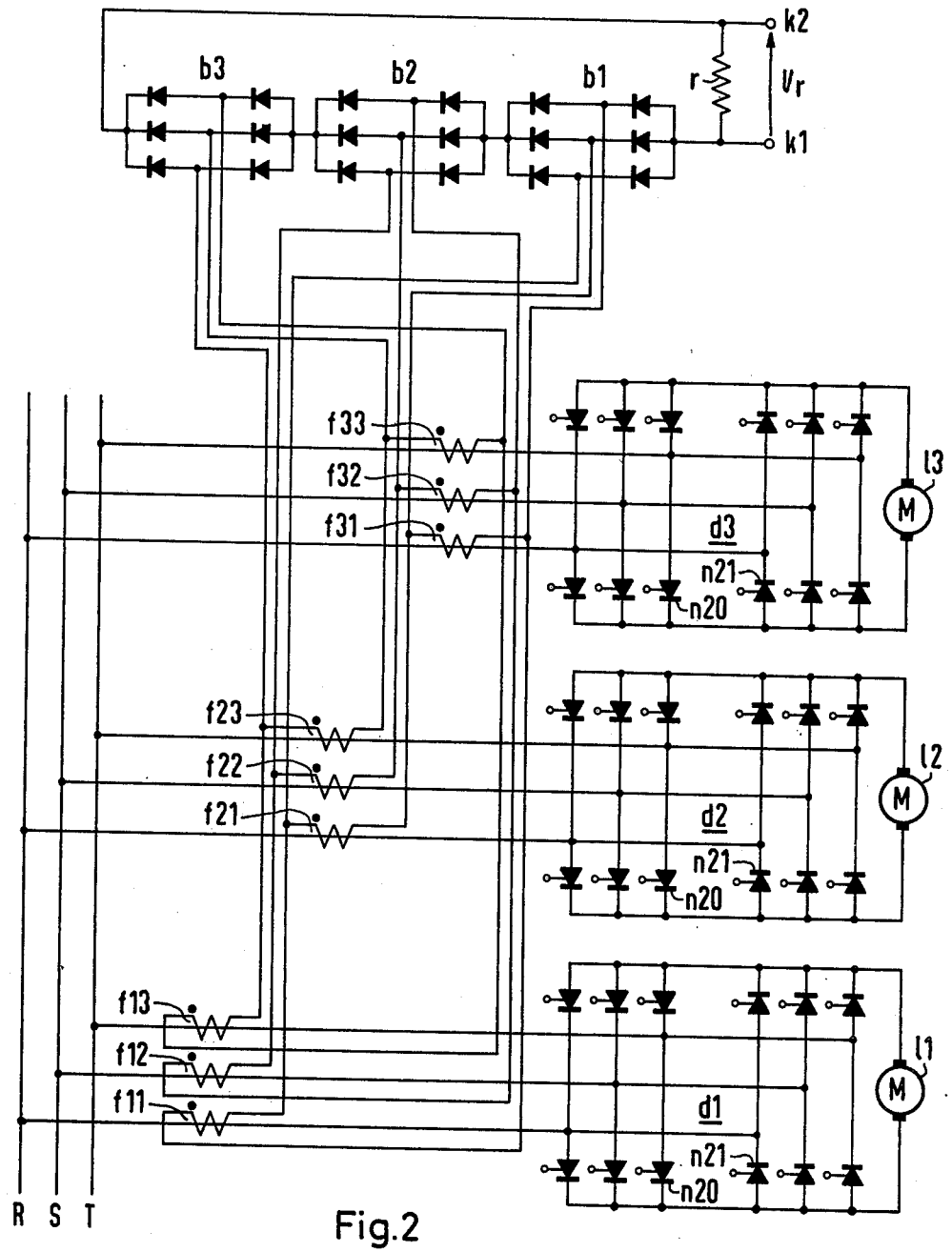
FIG. 2 shows several converters with one monitoring circuit.

FIG. 2 shows an embodiment examples of a monitoring circuit for the case that the valves to be monitored belong to different rectifiers (in this case, in a circulation-free antiparallel connection) and are not connected parallel to each other.

According to FIG. 2, three static converters $d1$, $d2$, $d3$, which are provided to supply similar loads 11, 12 and 13, respectively, are together connected on the input side to a three-phase a-c system with the phase conductors R, S, T. The loads 11, 12 and 13 may, in particular, be three similar d-c motors which are to be driven at equal speeds. The converters $d1$, $d2$ and $d3$ are of the same design. They may comprise controlled or uncontrolled valves $n20$ in a three-phase bridge circuit. In addition, they may comprise controlled or uncontrolled valves $n21$ in a three-phase bridge circuit connected antiparallel thereto. For controlling the three converters $d1$, $d2$ and $d3$ with equal frequency and phase, a common control unit (not shown) is provided.

To monitor the electric valves $n20$ and, if applicable, simultaneously the electric valves $n21$, a monitoring circuit is provided which contains three bridge circuits $b1$, $b2$ and $b3$ composed of auxiliary valves. The bridge circuits $b1$, $b2$ and $b3$ correspond here to the design of the bridge circuit $b$ in FIG. 1. In the case shown, they are connected in series on the output side, as then the individual indicating signals add up in an advantageous manner to form an overall alarm signal, if several disturbances occur simultaneously. It is also possible to connect the individual bridge circuits $b1$, $b2$, $b3$ parallel on the output side. The series connection of the bridge circuits $b1$, $b2$ and $b3$ is connected to a measuring resistor $r$. The bridge voltage $V_r$ taken off at its terminals $k1$, $k2$ which in the undisturbed case is practically zero, serves as the indicating signal in the case of trouble. It can be processed further in accordance with the circuit in FIG. 1 and can be utilized to trigger an alarm and/or protective measures.

Three current transformers are associated with each of the converters $d1$, $d2$, $d3$. These are, in particular, current transformers in which the lead of the valve in question is used as the primary winding. This lead is of simple design and is inserted through the secondary winding. The current transformers $f11$, $f12$, and $f13$ are associated with the converter $d1$. One of the primary windings of the former is always arranged in one of the leads between the three-phase a-c network and the converter $d1$. The current transformers $f21$, $f22$ and $f23$ are associated with the converter $d2$. Their primary windings are similarly arranged in the three leads of the converter $d2$. The current transformers $f31$, $f32$, $f33$, finally, are associated with the converter $d3$. They are likewise connected on the primary side into the leads from the system.

The individual secondary windings of the current transformers $f11$ to $f33$ are interlinked in such a manner that three ring circuits result, each of which is connected with their intermediate taps to the center taps of one of the three bridge circuits $b1$, $b2$ and $b3$. The secondary windings of the current transformers $f11$, $f21$ and $f31$ are connected here to form a first ring circuit. These three secondary windings $f11$, $f21$ and $f31$ are associated with the converters $d1$, $d2$ and $d3$, i.e., to different converters. They are therefore associated with the valves of different converters. These current transformers $f11$, $f21$ and $f31$ are therefore those which are always arranged in the leads of the converters d1, d2 and d3, respectively, which lead to the phase conductor R. Similarly, the secondary windings of those current transformers f12, f22, d32 are connected to form a second ring circuit, which ae always arranged on the primary side in the lead of the converters d1, d2 and d3, respectively, leading to the phase conductor S. Finally, the secondary windings of the current transformers f13, f23 and f33 are connected together to form a third ring circuit. These current transformers f13, f23 and f33 are arranged on the primary side in the three leads to the phase conductor T. The intermediate taps of the first ring circuit are connected to the center taps of the bridge circuit b1. Similarly, the intermediate taps of the second ring circuit are also connected to the center taps of the bridge circuit b2, and the intermediate taps of the third ring circuit to the center taps of the bridge circuit b3.

In the three converters d1, d2 and d3, (FIG. 2) corresponding valves n20, n21 of the three-phase bridge circuits always carry current simultaneously in the undisturbed condition. The valves n20 of the upper three-phase bridge circuit respectively shown at the upper left, for instance, carry current simultaneously. This current flows through that respective lead of the converters d1, d2 and d3, which is connected to the phase conductor R. Into these leads are connected the primary windings of the current transformers f11, f21 and f31 of equal construction, of the first ring circuit. If the currents in the primary windings are always equal, the following bridge circuit b1 shows no unbalance. If the same is true also for the other two bridge circuits b2 and b3, then essentially no output current flows through the measuring resistor r. If a valve drops out, however, for instance, the valve n20 of the converter d1 shown at the upper left, the two corresponding valves n20 of the converters d2 and d3 need not take over its current, but the equilibrium of the first ring circuit is disturbed. From this first ring circuit, a current flows into the bridge circuit b1, which causes a voltage drop $V_r$ at the measuring resistor r as the indicating signal. Similarly, a voltage drop is also produced simultaneously by that of the other two ring circuits, which contains that valve n20 which is associated in the time cycle with the valve n20, shown in the upper left in the converter d1. The current through this associated valve n20, coming from the load 11, is interrupted at the same time, as will be remembered.

The monitoring circuit shown in FIG. 2 therefore indicates if one of the valves n20, n21 of all converters d1, d2 and d3 is disturbed.

Figure 3:
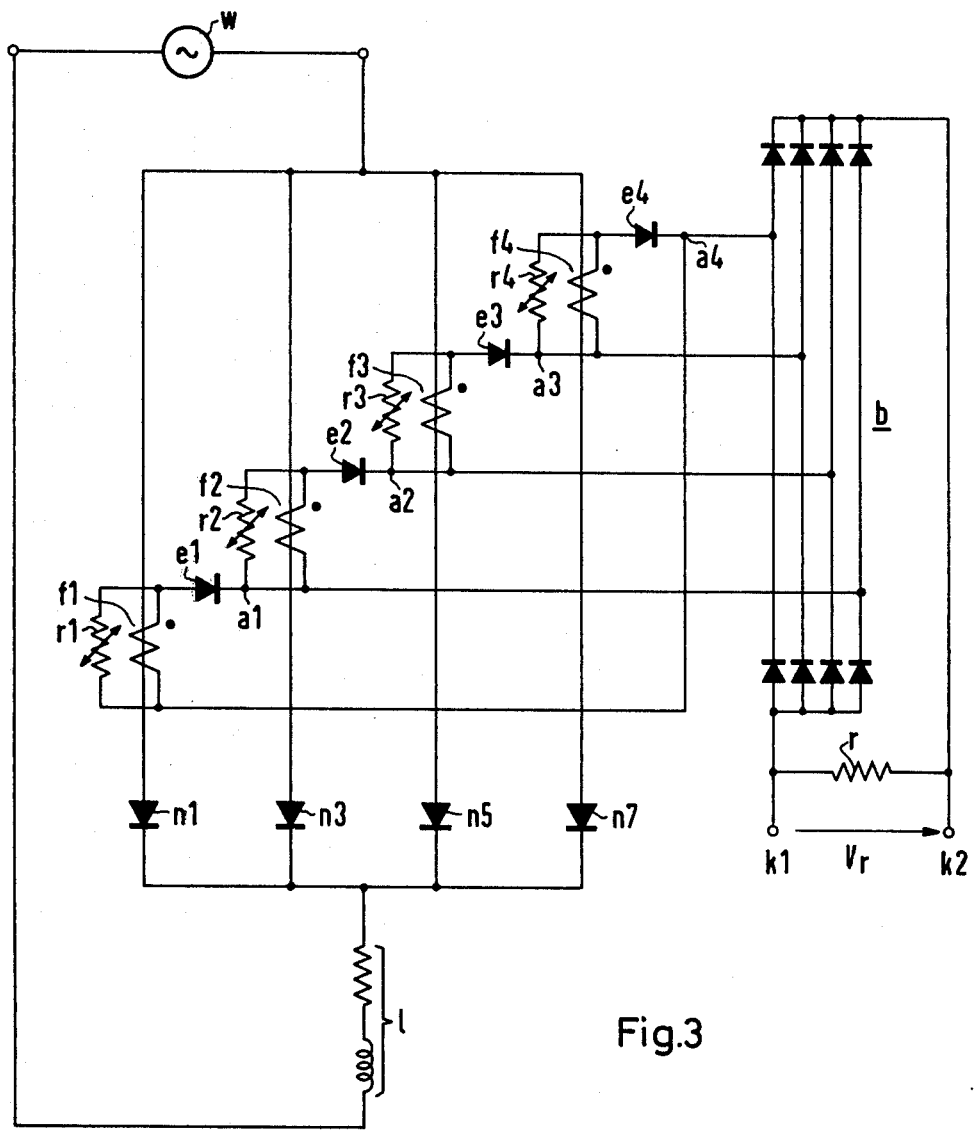
FIG. 3 shows another converter with one monitoring circuit.

FIG. 3 shows a further embodiment example of a monitoring circuit for the case that the valves to be monitored belong to the same converter and are connected parallel to each other.

According to FIG. 3, an a-c voltage source w supplies a load l via a converter with four uncontrolled valves n1, n3, n5 and n7, which are connected in parallel in a half-wave circuit. The load l again consists of an inductive and a resistive load component. The four uncontrolled valves n1, n3, n5 and n7 may be thyristors or semiconductor diodes. Instead of the uncontrolled valves, n1, n3, n5 and n7, controlled valves, e.g., thyristors, can also be used.

The primary winding of a current transformer f1, f2, f3 and f4, respectively, is connected in series with each of the parallel-connected valves n1, n3, n5, n7. These are anode current transformers, whose primary windings each consist of one turn and are brought through the corresponding secondary winding. A voltage-dependent resistor r1, r2, r3 and r4, respectively, is shunted across their secondary windings. These secondary windings are connected together via intermediate taps a1, a2, a3 and a4 to form a ring circuit. A diode e1, e2, e3 or e4 is further included between each two secondary windings of the ring circuit. The polarity of these diodes e1, e2, e3 and e4 is the same for all of them within the ring circuit. The intermediate taps a1, a2, a3 and a4, which lead to the center taps of a bridge circuit b constructed from auxiliary valves, are connected to the cathodes of these diodes e1, e2, e3 and e4. The bridge circuit b again applies a signal to a measuring resistor r, at the terminals k1, k2 of which a bridge voltage $V_r$ can be taken off in the case of a disturbance.

The diodes e1, e2, e3 and e4 are provided for the purpose of keeping the magnetizing current of the current transformers f1, f2, f3, f4 away from the bridge circuit b.

During the positive half-wave of the a-c voltage of the a-c voltage source w, all the valves n1, n3, n5, n7 carry current simultaneously. All the secondary voltages induced in the secondary windings of the current transformers f1, f2, f3, f4 are of equal magnitude. During the negative half-wave of the a-c voltage, the valves n1, n3, n5, n7 are cut off. In the respective secondary windings, the magnetization current begins to flow, the direction of which always is from the end marked with a dot to the other end of the secondary winding. The path via the ring circuit is blocked for these magnetizing currents by the opposingly poled diodes e1, e2, e3, e4. These currents can also not flow via the bridge circuit b, but must flow via the parallel-connected, voltage-dependent resistors r1, r2, r3 and r4, respectively. It is achieved thereby that the magnetization current can always vanish quickly, so that the current transformers f1, f2, f3 f4 are available again, demagnetized, for a measurement during the next positive half-wave.

What is claimed is:
1. A monitoring circuit for a plurality of parallel current carrying valves, each valve having a control terminal connected to a control circuit by way of a control line, said parallel valves being in series with an a.c. load line, comprising
   a plurality of current transformers wherein each of the transformers has its primary winding connected in series with at least one of the valves and has its secondary winding connected to all other secondary windings in series forming a ring by means of intermediate taps,
   a bridge circuit comprising a plurality of parallel-connected legs, one associated with each of said transformers, wherein each leg comprises two series connected auxiliary valves wherein each center tap of said series connected valves is connected to said intermediate tap of the associated transformer, and
   means for measuring current flow from the parallel-connected legs.
2. The circuit of current 1 wherein said measuring means is a resistor connected in parallel with said legs, the voltage across said resistor being proportional to said current flow from the parallel-connected legs.
3. The circuit of claim 1 wherein said auxiliary valves are diodes.
4. The circuit of claim 2 further comprising
   means for comparing said voltage across said resistor with a predetermined standard, and means responsive to said comparing means for providing an alarm signal if said current flow from the parallel-connected legs is greater than said predetermined standard.

5. The circuit of claim 2 further comprising
means for comparing said voltage across said resistor with a predetermined standard, and
switching means connected in said control line responsive to said comparing means for causing an open circuit in said control line if said voltage across said resistor is greater than said predetermined standard.

6. The circuit of claim 2 further comprising
means for comparing said voltage across said resistor with a predetermined standard, and
switching means connected in said a.c. load line responsive to said comparing means for causing an open circuit in said a.c. load line if said voltage across said resistor is greater than said predetermined standard.

7. The circuit of claim 1 wherein said plurality of parallel current carrying valves are connected in a first group of parallel-connected controlled valves for the positive current direction and a second group of parallel-connected controlled valves for the negative current direction and wherein a current transformer is associated with each controlled valve for the positive current direction and each controlled valve for the negative current direction.

8. The circuit of claim 1 wherein the lead of the respective valve serves as the primary winding of each current transformer.

9. In a system for supplying at least two different loads from a multi-phase a.c. line and including a converter interposed between each of the loads and an a.c. line, each of the converters including a plurality of valves which simultaneously carry current, an improved monitoring circuit comprising:
   a. a group of current transformers for each converter having their primaries coupled in series with the individual valves of their associated converters with the secondaries of all of said groups of current transformers which are simultaneously carrying current of the same magnitude and phase coupled in series with each other to form a ring; and
   b. at least one bridge circuit comprising a plurality of parallel connected legs, each leg comprising two series connected auxiliary valves the center of taps of said parallel legs coupled to the center taps between secondary windings in a series connected group of secondary windings.

10. The circuit of claim 9 wherein a bridge circuit is provided for each different phase, the center taps of the parallel arms in each bridge coupled to the corresponding center taps of a group of secondary windings for that phase coupled in series and wherein all bridge circuits are coupled in series with each other and a rectifier.

11. In an arrangement wherein each of a plurality of loads is fed from a three-phase line through a three-phase bridge rectifier made up of controlled rectifiers, an improved monitoring circuit comprising:
   a. a plurality of current transformers, one being provided for each phase of each controlled rectifier bridge, the primaries of said current transformers being coupled in series with the a.c. inputs to said controlled rectifier bridges with the secondaries of said transformers coupled such that the secondaries associated with each individual phase are coupled in series with each other to form a ring; and
   b. an auxiliary, uncontrolled bridge circuit for each phase, each bridge circuit having a number of parallel arms equal to the number of loads being supplied, each arm made up of two series connected, uncontrolled valves, the center tap of each arm coupled to a tap between secondary windings in the series connection of secondary windings corresponding to the phase with which it is associated, said bridges for each phase coupled in series with each other and with a resistor.

12. In an arrangement in which a load is supplied from an a.c. source through a plurality of rectifier valves in parallel, all of said valves being poled in the same direction, to form a half-wave rectifying circuit, an improved measuring arrangement comprising:
   a. a plurality of current transformers, one being provided for each of said parallel connected valves;
   b. a plurality of diodes equal in number to the number of current transformers coupling the secondaries of said current transformers in series with each other, one diode being interposed between each two windings so as to form a ring circuit made up of said secondary windings with a diode between each two secondary windings, all of said secondary windings and diodes having the same polarity; and
   c. a bridge circuit having a number of legs equal to the number of current transformers, each leg comprising two diodes in series with the center tap of respective legs coupled to the respective transformer secondaries such that said coupling is through the diodes in series therewith.

13. The circuit according to claim 12 and further including a voltage dependent resistor coupled in parallel with each of said current transformer secondaries.

14. The circuit according to claim 12 wherein said parallel connected rectifiers have their anodes coupled to the a.c. source and wherein said diodes in parallel with said secondary windings have a polarity such as to couple only the positive half cycle into said bridge circuit.

15. A monitoring circuit for a plurality of parallel current carrying valves connected in a first group of parallel connected controlled valves for the positive current direction and a second group of parallel connected controlled valves for the negative current direction, each valve having a control terminal connected to a control circuit by way of a control line, said parallel valves being in series with an a.c. load line, comprising: a plurality of current transformers, one being associated with each control valve for the positive current direction and each controlled valve for the negative current direction, each of said transformers having its primary winding connected in series with at least one of the valves and its secondary winding connected to all other secondary windings in series forming a ring by means of intermediate taps; a bridge circuit comprising a plurality of parallel connected legs, one associated with each of said transformers, each of said legs comprising two series connected auxiliary valves with each center tap of said series connected valves connected to the intermediate tap of its associated transformer; means for measuring current flow from the parallel connected legs; and wherein the total of said first group and said second group of parallel controlled valves is not equal to three.

16. The circuit of claim 1 wherein said auxiliary valves are diodes.

* * * * *